(12) United States Patent
Lansiaux et al.

(10) Patent No.: US 11,407,519 B2
(45) Date of Patent: Aug. 9, 2022

(54) REAR ENGINE ATTACHMENT FOR AN AIRCRAFT PROPULSION UNIT

(71) Applicant: Airbus Operations SAS, Toulouse (FR)

(72) Inventors: Rémi Lansiaux, Toulouse (FR); Anthony Mertes, Albi (FR); Pascal Forichon, Toulouse (FR); Patrice Perez, Fronton (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 336 days.

(21) Appl. No.: 16/814,475

(22) Filed: Mar. 10, 2020

(65) Prior Publication Data
US 2020/0346772 A1 Nov. 5, 2020

(30) Foreign Application Priority Data
Mar. 11, 2019 (FR) .................................. 1902443

(51) Int. Cl.
*B64D 27/26* (2006.01)
*B64D 27/02* (2006.01)
B64D 45/00 (2006.01)

(52) U.S. Cl.
CPC ............ *B64D 27/26* (2013.01); *B64D 27/02* (2013.01); *B64D 2027/268* (2013.01); *B64D 2045/0085* (2013.01)

(58) Field of Classification Search
CPC .. B64D 27/26; B64D 27/02; B64D 2027/268; B64D 2045/0085
See application file for complete search history.

(56) References Cited

U.S. PATENT DOCUMENTS

| | | | | |
|---|---|---|---|---|
| 5,860,623 A | * | 1/1999 | Dunstan | B64D 27/26 60/797 |
| 2009/0294580 A1 | * | 12/2009 | Sam | B64D 27/26 244/54 |

(Continued)

FOREIGN PATENT DOCUMENTS

| | | |
|---|---|---|
| EP | 2921727 A1 | 9/2015 |
| EP | 3015368 A1 | 5/2016 |

(Continued)

OTHER PUBLICATIONS

French Search Report; priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

A rear engine attachment having a beam fixed to a pylon, a spreader pivotally mounted on the beam, the spreader comprising two ends situated on either side of a median plane, two rods located one on either side of the median plane, each rod having a first end fixed to one end of the spreader by a ball joint and a second end fixed to the engine, each ball joint comprising a clevis with two arms at the first end of the rod, a swivel bearing arranged on the end of the spreader, and a hinge pin passing through the two arms, the swivel bearing arranged between the two arms and fitted on the hinge pin. For each ball joint, an interface part is removably interposed between the end of the spreader and the first end of the rod and forms a contact surface between the spreader and the rod.

3 Claims, 4 Drawing Sheets

(56) References Cited

U.S. PATENT DOCUMENTS

| | | | | |
|---|---|---|---|---|
| 2014/0077027 A1* | 3/2014 | Durand | ................. | B64D 27/26 244/54 |
| 2015/0175268 A1* | 6/2015 | Guillou | ................. | B64D 27/26 244/54 |
| 2015/0259063 A1* | 9/2015 | Osvog | ...................... | F16C 9/04 403/113 |
| 2016/0090868 A1* | 3/2016 | Brain | ...................... | F16B 39/10 470/4 |
| 2016/0122029 A1* | 5/2016 | Serra | ..................... | B64D 27/26 244/54 |
| 2018/0327102 A1* | 11/2018 | Couffignal | ............ | B64D 27/26 |

FOREIGN PATENT DOCUMENTS

| | | |
|---|---|---|
| FR | 3058986 A1 | 5/2018 |
| WO | 2012131233 A2 | 10/2012 |

* cited by examiner

REAR ENGINE ATTACHMENT FOR AN AIRCRAFT PROPULSION UNIT

CROSS-REFERENCES TO RELATED APPLICATIONS

This application claims the benefit of the French patent application No. 1902443 filed on Mar. 11, 2019, the entire disclosures of which are incorporated herein by way of reference.

FIELD OF THE INVENTION

The present invention relates to a rear engine attachment for an aircraft propulsion unit.

BACKGROUND OF THE INVENTION

An aircraft comprises a wing, under which there is fixed a propulsion unit comprising a pylon slung from the wing and a turbomachine having an engine fixed to the pylon via a system of engine attachments made up of a front engine attachment at the front and of a rear engine attachment at the rear.

The document FR3058986 discloses a rear engine attachment, which has a beam fixed to the engine pylon, fittings connecting the beam to the engine and a spreader mounted on the beam in a movable manner by way of a pivoting connection. On each side of the median plane of the turbomachine, a thrust rod connects the engine to one end of the spreader in order to transmit engine forces to the pylon while the engine is in operation. Since the thrust rod has a ball joint at each of its ends, there is thus a degree of freedom that allows the rod to rotate about its axis. Consequently, the edge faces of the end of the thrust rod come into contact with the spreader.

During operation of the engine, which generates vibrations that propagate partially through each thrust rod, the shank of each of the thrust rods tends to turn slightly about its axis, causing wear to the spreader at the contact surface with the edge faces of the thrust rod, and wear to the thrust rod. This wear reduces the service life of the spreader and of the thrust rod, since, beyond a certain amount of wear, the spreader and the thrust rod have to be replaced, requiring the complete disassembly of the rear engine attachment.

The patent application describes a solution for eliminating the wear to the spreader that is caused by the contact thereof with the edge face of the thrust rods.

To this end, the invention relates to a rear engine attachment for an aircraft propulsion unit, which is intended, in the use position, to fix an engine to a pylon, the rear engine attachment having:

a beam fixed, in the use position of the rear engine attachment, to the pylon,
  a spreader mounted on the beam so as to be movable by way of a pivoting connection about a main axis of rotation, the spreader comprising a median plane and two ends situated on either side of the median plane,
  two thrust rods located one on either side of the median plane, each thrust rod having a first end fixed to one end of the spreader by a ball joint connection and a second end fixed, in the use position of the rear engine attachment, to the engine, the two thrust rods and the spreader fixed to the beam together defining a primary thrust path between the engine and the engine pylon in order to bear the engine thrust, each of the ball joint connections comprising a clevis with two arms that is formed at the first end of the thrust rod, a swivel bearing arranged on the end of the spreader, and a hinge pin passing through the two arms, the swivel bearing being arranged between the two arms and fitted on the hinge pin, wherein, for each ball joint connection, an interface part is interposed in a removable manner between the end of the spreader and the first end of the thrust rod and forms a contact surface between the end of the spreader and the first end of the thrust rod.

BRIEF DESCRIPTION OF THE DRAWINGS

The abovementioned features of the invention, and others, will become more clearly apparent from reading the following description of an exemplary embodiment, the description being given with reference to the appended drawings, in which.

DETAILED DESCRIPTION OF THE PREFERRED EMBODIMENTS

Figure 1:
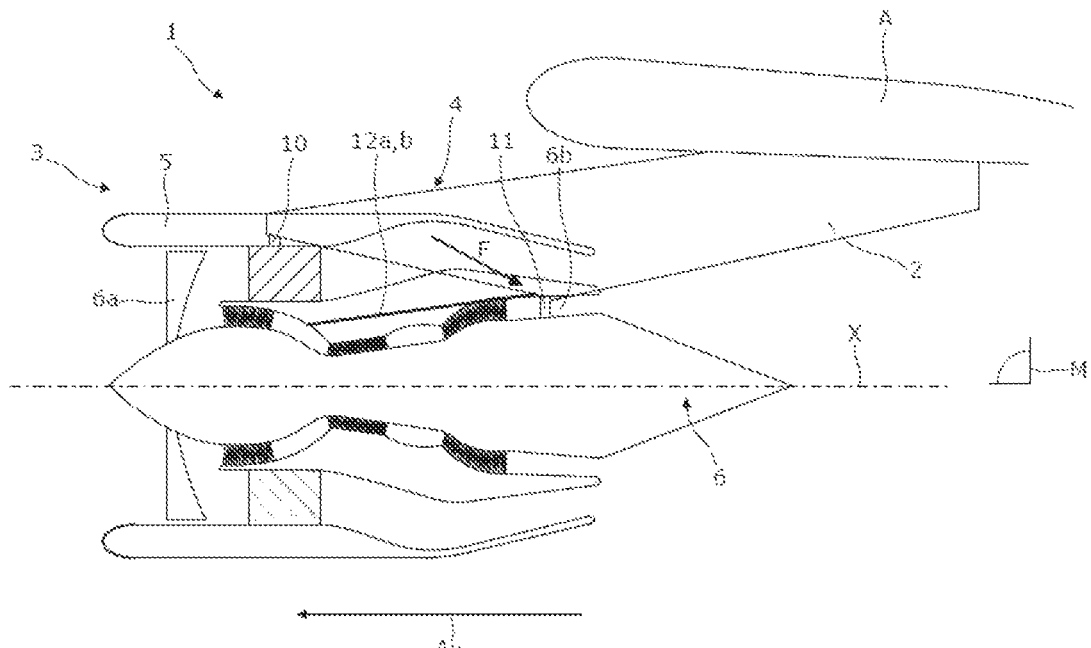
FIG. 1 is a schematic view of an aircraft propulsion unit, the unit comprising a front engine attachment and a rear engine attachment according to invention for fixing an engine to the pylon.

In relation to FIG. 1, an aircraft propulsion unit 1 comprises a pylon 2 fixed under the wing A of an aircraft (not shown) and a turbomachine 3 fixed to the pylon 2 by an engine attachment system 4. The turbomachine 3 comprises an annular nacelle 5 which is centered on a longitudinal axis X of the turbomachine 3 and surrounds a fan 6a situated at the front of the turbomachine 4 and also an engine 6, which is situated behind the fan 6a and drives the fan 6a in rotation while it is in operation. The turbomachine 3 is fixed to the pylon 2 by an engine attachment system 10.

In the rest of the description, the terms "front" and "rear" should be considered in relation to the direction of movement of the aircraft, indicated by an arrow Av in FIG. 1.

The engine attachment system 4 is made up, at the front, by a front engine attachment 10 and, at the rear, by a rear engine attachment 11, which comprises two thrust rods 12a, 12b located one on either side of the median (sagittal) plane M of the turbomachine.

The front engine attachment 10 is fixed between the pylon 2 and a casing that surrounds the fan 6a and is secured to the engine 6, while the rear engine attachment 11 is fixed between the pylon 2 and a rear casing 6b secured to the engine 6. Each thrust rod 12a, 12b connects a clevis secured to the engine 6, the clevis being situated in front of the latter, to the rear engine attachment 11 in order to react thrust forces of the engine 6 at the rear engine attachment 11.

Figure 2:
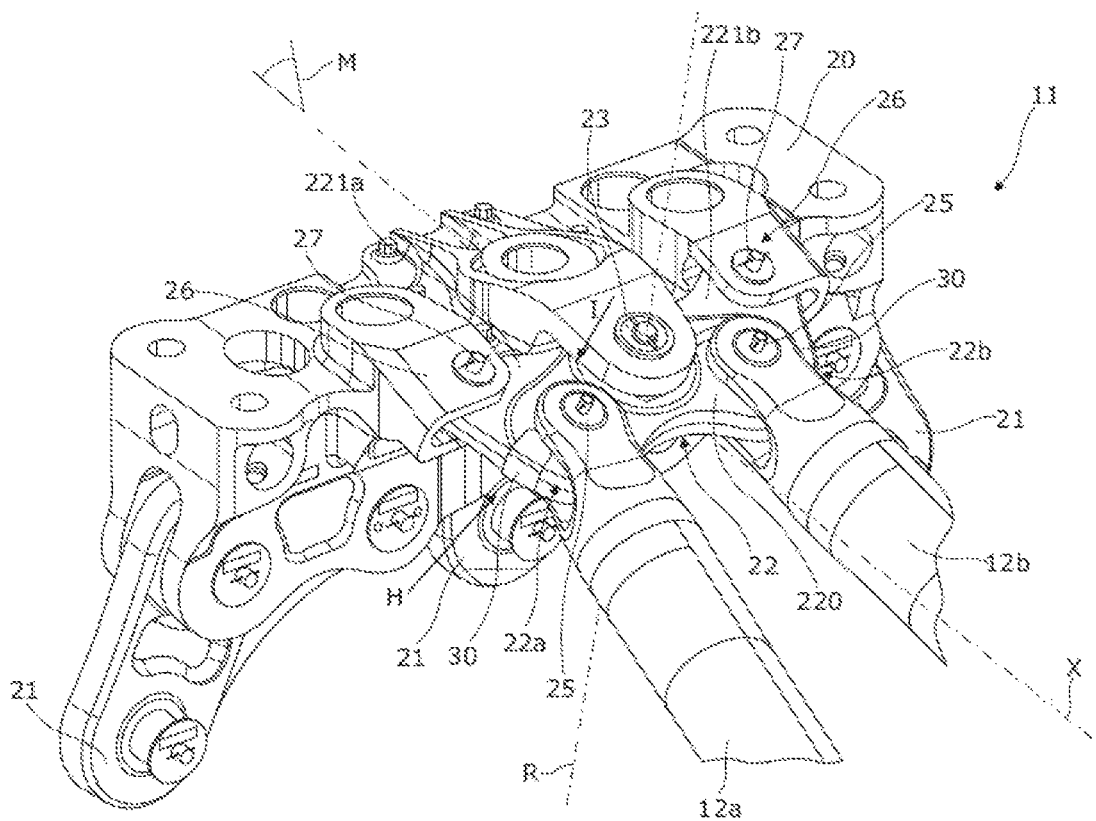
FIG. 2 is a perspective detail view along the arrow F of a rear engine attachment shown in FIG. 1.

As shown in FIG. 2, the rear engine attachment 11 has a beam 20, which is fixed, for example bolted, to the pylon 2 (only shown in FIG. 1) and which bears various fittings 21 fixed to the rear casing 6*b* of the engine 6 (also shown only in FIG. 1). The rear engine attachment 11 comprises a spreader 22, which is mounted on the beam 20 so as to be movable by way of a tight pivoting connection 23 (that is to say, one without play—for example via a pin system) about an axis of rotation R, which is substantially perpendicular to the longitudinal axis X of the turbomachine 3 and contained in the median plane M of the turbomachine 3.

The spreader 22 comprises a core 220 with two ends 22*a*-22*b* disposed symmetrically with respect to the median plane M (which is also the median plane of the spreader). The rear end of a first thrust rod 12*a* is mounted in a movable manner by way of a tight ball joint connection 25 (that is to say, one without play) to a first end 22*a* of the core 220 and the rear end of a second thrust rod 12*b* is mounted in a movable manner by way of a tight ball joint connection 25 to the second end 22*b* of the core 220.

The two thrust rods 12*a*-*b* and the spreader 22 fixed to the beam 20 together define a primary thrust path between the engine 6 and the pylon 2 for bearing the thrust of the engine 6.

According to the invention, on each side of the median plane M of the turbomachine 3 and for each ball joint connection 25, an interface part 30 fixed to the spreader 22 is interposed between the spreader 22 and the rear end of the thrust rod 12*a*-*b* at a contact surface between the thrust rod 12*a*-*b* and the spreader 22. Thus, the interface part 30 forms a wearing part that will wear down in contact with the thrust rod 12*a*-*b* and protect the spreader 22.

Figure 3:
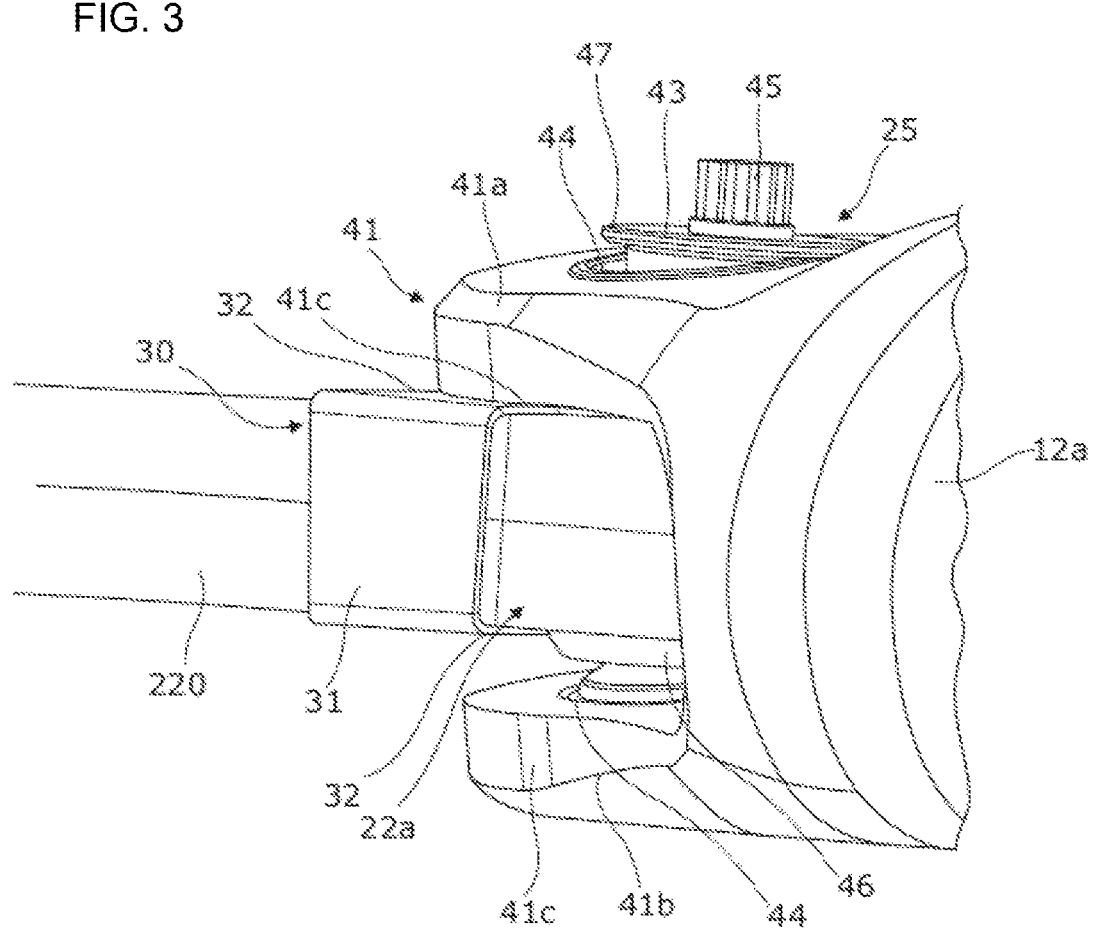
FIG. 3 is a perspective detail view along the arrow H of the rear engine attachment shown in FIG. 2.
Figure 4:
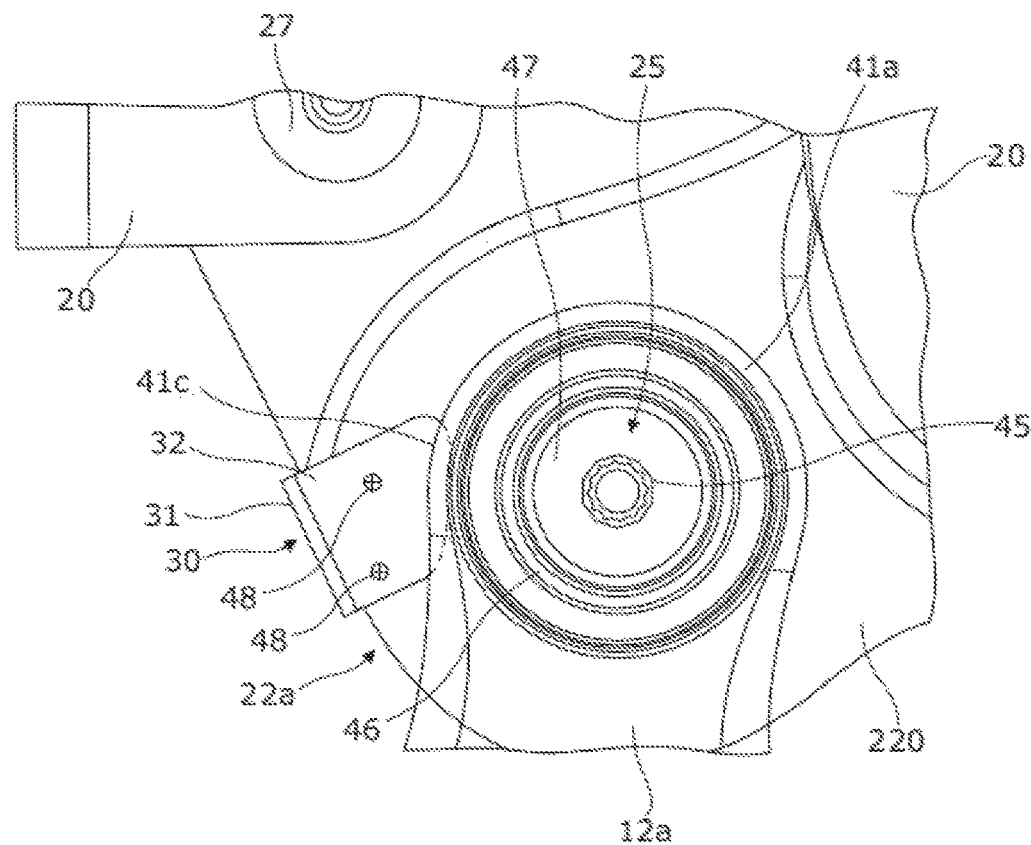
FIG. 4 is a perspective detail view along the arrow I of the rear engine attachment shown in FIG. 2.

In detail, and with reference to FIGS. 3 and 4, each of the ball joint connections 25 between the spreader 22 and one of the thrust rods 12*a*-*b* is made up of a clevis 41, which is formed at the rear end of the rod 12*a*-*b* and comprises two arms 41*a*-*b*, where each of the arms 41*a*-*b* comprises an edge face 41*c* that would normally come into contact with the core 220 in the absence of the interface part 30. Each arm 41*a*-*b* comprises a bore 44.

A swivel bearing 46 arranged on the end 22*a*-*b* of the core 220 is disposed between the two arms 41*a*-*b* and a hinge pin 43 that is in the form of a hollow cylindrical body is fitted in each of the bores 44 made in the arms 41*a*-*b* and in a bore of the swivel bearing 46.

In order to immobilize the hinge pin 43 in terms of translational movement, a screw (not shown) is inserted into the hollow cylindrical body of the hinge pin 43 and the shank of the screw extends along a length greater than that of the hinge pin 43. A pair of locking washers 47 (only one of which is shown in FIGS. 3 and 4) are fitted on the screw, with a first washer 47 positioned between the head of the screw and the hinge pin 43 and a second washer 47 positioned between the hinge pin 43 and a clamping nut 45 fixed to the threaded free end of the shank of the screw.

The interface part 30 is in the overall form of a clip, which grips the end 22*a*-*b* of the core 220 of the spreader on which it is mounted. The interface part 30 comprises a base 31 and two main flanges 32 extending away from the base 31 on each side of the latter. Each of the main flanges 32 is flat and has an internal face and an external face, the internal faces of two main flanges of an interface part 30 facing one another and being generally parallel.

In its operational position, the interface part 30 is positioned on the end 22*a*-*b* of the core 220 in the region of the ball joint connection 25 and the base 31 rests on the edge of the core 220 of the spreader. The internal face of a first main flange 32 rests on a first face of the core 220 of the spreader and the internal face of a second main flange 32 rests on a second face of the core 220.

As can be seen more particularly in FIG. 4, the length of the main flanges 32, measured from the base 31 in a direction normal to the base 31, is such that the interface part 30 does not interfere with the operation of the ball joint connection 25. Thus, it will be noted that, in the example in FIG. 4, the main flange 32 (a part of which is depicted so as to show hidden detail) has an end with a form designed to skirt the swivel bearing 46 so as not to limit the movement of the rod 12*a*-*b* with respect to the spreader 22.

By contrast, the main flanges 32 have a length (measured from the base 31 in a direction normal to the base) such that the external face of each main flange 32 forms a contact face for the edge faces 41*c* of the arms 41*a*-*b* of the clevis 41, which would normally come into contact with the core 220 in the absence of the interface part 30.

The interface part 30 is fixed to the spreader 22 by removable means such as, for example, screws 48 (only visible in FIG. 4) passing through a main flange 32 and a part of the thickness of the core 220 of the spreader 22. The interface part 30, which may be considered to be a wear pad, is consequently easily replaceable.

The rear engine attachment 11 according to the invention, comprising an interface part 30 arranged in the region of each ball joint connection 25 between the spreader and a thrust rod 12*a*-*b*, makes it possible to greatly and easily reduce the maintenance costs by eliminating any direct contact between the thrust rod 12*a*-*b* and the spreader 22.

The wear brought about by relative movements between these two parts is henceforth transferred to the interface part 30, which can be replaced quickly and at a lower cost.

In a known manner, and with reference to FIG. 2, the rear engine attachment 11 has a waiting failsafe system, which compensates for any failure of the primary thrust path. Such a failure usually arises when, for one of the thrust rods 12*a*-*b*, referred to as defective rod, the ball joint connection 25 between the core 220 of the spreader 22 and the defective rod exhibits play, or when the ball joint connection (not shown) between the defective rod and the engine 6 exhibits play.

The spreader 22 has, on each side of the median plane M, a lug 221*a*-*b* that extends the core 220. The lug 221*a*-*b*, on each side of the median plane M, is partially received between the arms of a clevis 26 formed in the beam 20.

An oblong hole (not shown) is realized in each lug 221*a*-*b* and each oblong hole is passed through by a pin that is secured to the clevis 26 formed in the beam 20. The diameter of the pin is less than the internal dimensions of the oblong hole so as to allow one to move with respect to the other. Each oblong hole and the associated pin thus form a safety connection 27.

In the event of failure of the primary thrust path, the spreader 22 pivots about the axis of rotation R at the pivoting connection 23 on account of the difference in tension exerted on the spreader 22 by the defective rod compared with the tension exerted on the spreader by the other thrust rod. The rotation of the spreader 22 about the axis of rotation R is stopped by the interaction of the pin associated with the oblong hole with the walls of the oblong hole.

Figure 5:
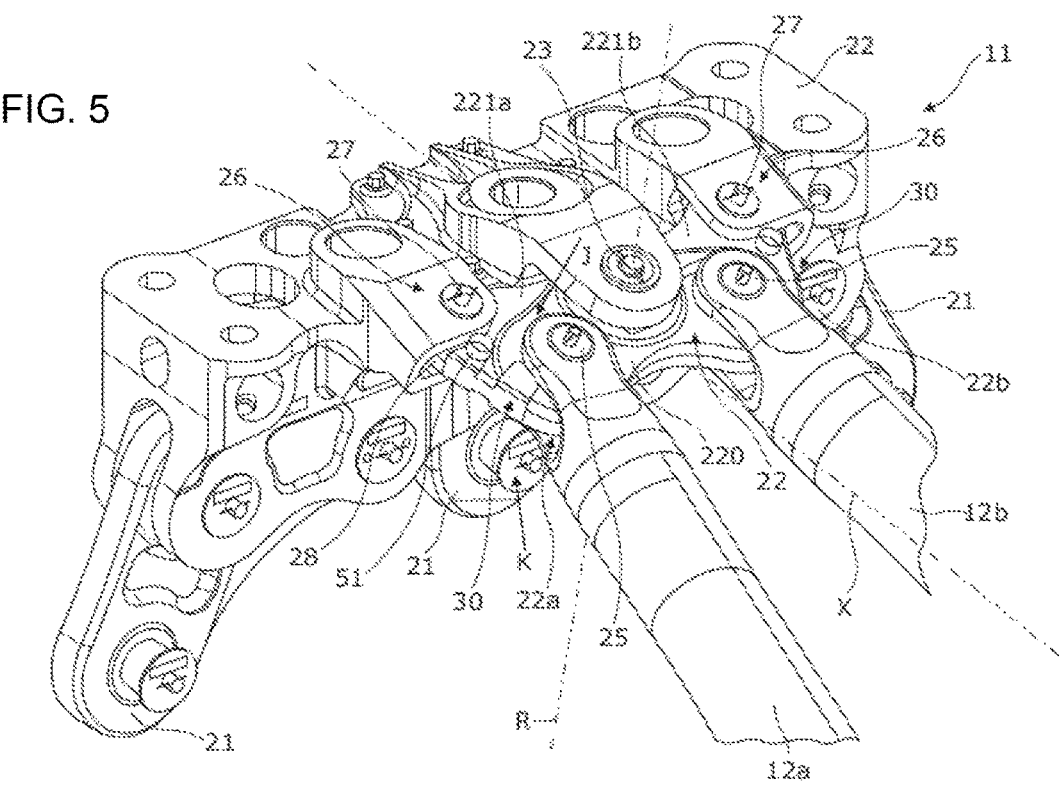
FIG. 5 is a view similar to FIG. 2, showing a perspective detail view along the arrow F of a rear engine attachment shown in FIG. 1, in an embodiment variant of the invention.
Figure 6:
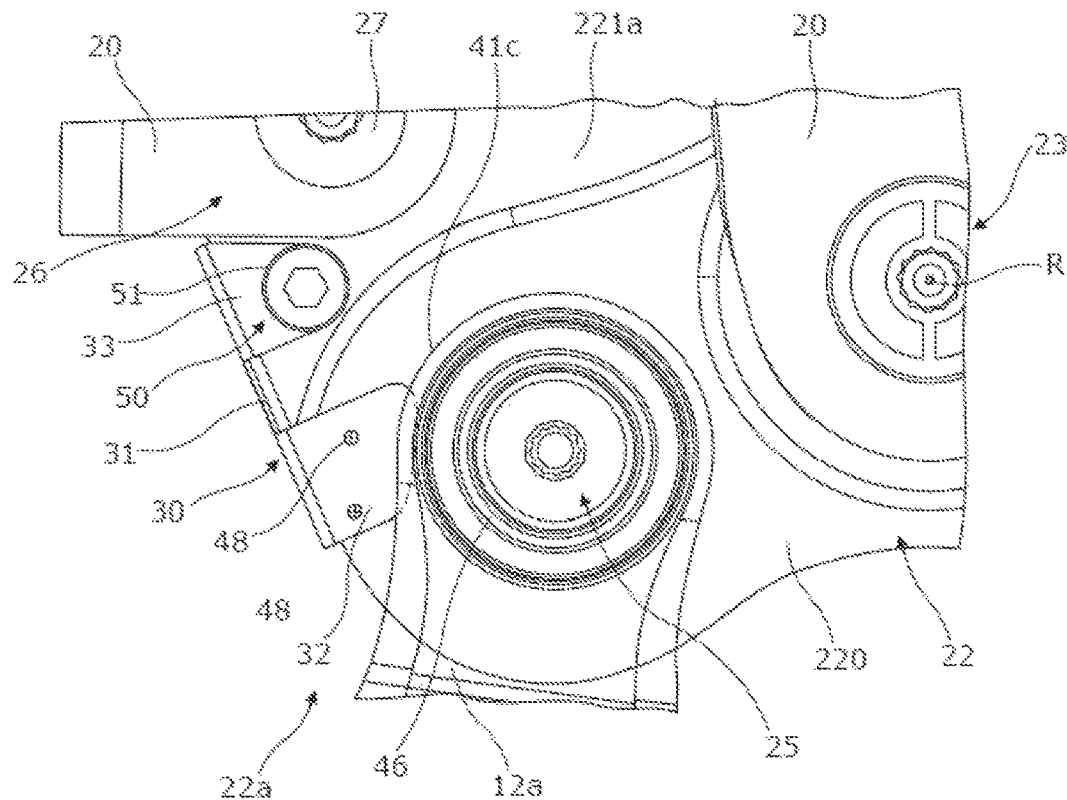
FIG. 6 is a perspective detail view along the arrow J of the rear engine attachment shown in FIG. 5.
Figure 7:
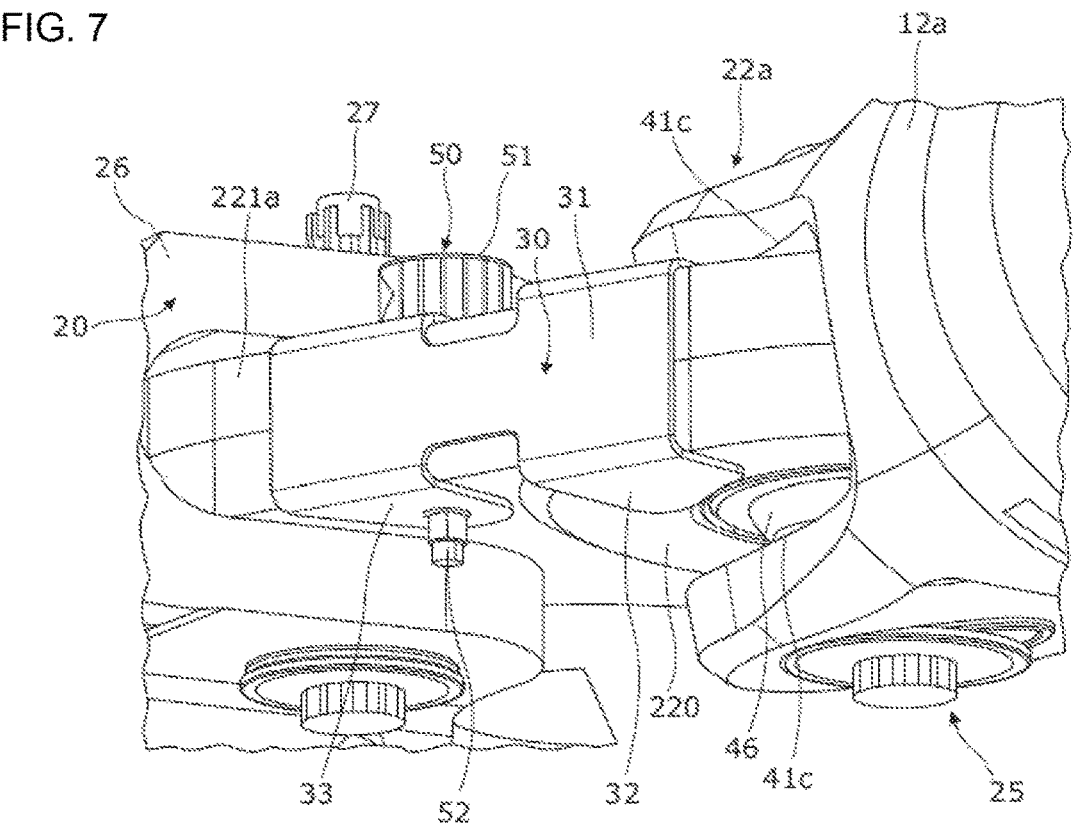
FIG. 7 is a perspective detail view along the arrow K of the engine attachment shown in FIG. 5.

According to a variant of the invention, and with reference to FIGS. 5 to 7, the interface part 30 comprises at least one breakage indicator 50 arranged between the spreader 22 and the beam 20 in order to detect any rotation of the spreader 22 about the axis of rotation R following failure of the main thrust path when a thrust rod 12*a*-*b* is defective. The breakage indicator is configured to be damaged by being crushed by the beam 20 in the event of the spreader 22 rotating about the axis of rotation R.

The interface part 30 is in the form of a double clip for fixing the breakage indicator 50. The base 31 comprises two main flanges 32 as described above, but also two secondary flanges 33 extending away from the base 31. Each of the secondary flanges 32, 33 is flat and has an internal face and an external face, the internal faces of the two secondary flanges of an interface part 30 facing one another and being generally parallel.

When the interface part 30 is in its operational position, the base 31 rests on the edge of the spreader, more specifically here on the edge of the core 220 of the spreader and on the edge of the lug 221a-b of the spreader. As described above, the internal face of each main flange 32 rests on a face of the core 220 of the spreader and the external face of each main flange 32 forms a contact surface for the edge faces of the clevis 41 arranged at the rear end of the thrust rod 12a-b. The internal face of each secondary flange 33 rests on a face of the lug 221a-b of the spreader.

The breakage indicator 50 is in the form of a deformable hollow cylinder 51 fixed to the external face of one of the secondary flanges 33 of the interface part 30 which is easily visible to an operator. The breakage indicator is thus arranged between one of the arms of the clevis 26 formed in the beam 20 and the core 220. The axis of revolution of the hollow cylinder 51 is perpendicular to the plane of the external face of the secondary flange 33 on which the hollow cylinder 51 is arranged. In the example illustrated in the figure, the hollow cylinder 51 is fixed via a bolt 52 that passes through the lug 221a-b and the secondary flanges 32.

As long as the primary thrust path is intact, the breakage indicator 50 is at a distance from the beam 20 and is therefore not subject to any deformation. By contrast, in the event of failure of a thrust rod, the spreader 22 pivots and the deformable hollow cylinder 51 comes into contact with an arm of the clevis 26 of the beam 20. Consequently, the hollow cylinder 51 is deformed by being crushed.

The deformation of the hollow cylinder 51 is visible to the naked eye or by means of a deformation gauge that can be inserted into the cylinder 51 when the latter is completely intact but, by contrast, cannot be received in the cylinder 51 if the latter has been deformed, even slightly.

Thus, during a maintenance inspection, the presence of a deformation of the hollow cylinder 51 is the sign that failure of the primary thrust path occurred while the aircraft was in flight. These inspections can thus be carried out without disassembly of the rear engine attachment 11, resulting in a saving of time.

In the example illustrated in the figures, the thickness of the core 220 of the spreader is greater than the thickness of each lug 221a-b, this explaining the form of the interface part 30 with secondary flanges. In the event of failure of a thrust rod 12a-b, the deformable hollow cylinder 51 is then clamped in a vice-like grip between the arm of the clevis 26 of the beam 20 and the overthickness of the core 220, thereby increasing the degree of deformation by crushing of the cylinder 51 so as to make it more clearly visible to the naked eye.

The thickness of the core 220 of the spreader could, however, be the same as the thickness of each lug 221a-b, in which case the interface part 32 would comprise only one flange on each side of the base, which would be interposed between the thrust rod and the spreader in the region of the ball joint connection 25 therebetween, and on an external face of which the breakage indicator would be fixed.

Advantageously, in order to make it easier to detect the crushing of the cylinder 51 by the naked eye, an end stop could be arranged on the core 220 so as to form, in conjunction with the clevis 26, a vice for the hollow cylinder 51.

The present invention relates to a safety connection of an engine attachment of an aircraft propulsion unit and to an aircraft propulsion unit equipped with such a safety connection.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine attachment for an aircraft propulsion unit, which is configured, in a use position, to fix an engine to a pylon, the rear engine attachment comprising:
   a beam fixed, in the use position of the rear engine attachment, to the pylon,
   a spreader mounted on the beam and configured to be movable by way of a pivoting connection about a main axis of rotation, the spreader comprising:
      a median plane and two ends situated on either side of the median plane,
      two thrust rods located one on either side of the median plane, each thrust rod having a first end fixed to an end of the spreader by a ball joint connection and a second end fixed, in the use position of the rear engine attachment, to the engine,
   the two thrust rods and the spreader fixed to the beam together defining a primary thrust path between the engine and the engine pylon to bear an engine thrust, each of the ball joint connections comprising a clevis with two arms that is formed at the first end of the thrust rod,
   a swivel bearing arranged on the end of the spreader, and
   a hinge pin passing through the two arms, the swivel bearing being arranged between the two arms and fitted on the hinge pin,
   wherein, for each ball joint connection, an interface part is interposed in a removable manner between the end of the spreader and the first end of the thrust rod and forms a contact surface between the end of the spreader and the first end of the thrust rod,
   wherein each interface part is formed as a clip and comprises a base and flat flanges extending away from the base on each side of the base, the base resting on an edge of the spreader, and each flange comprising an external face and an internal face, the internal face resting on a face of the spreader,
   wherein each interface part comprises a breakage indicator provided to come into contact with the beam and to deform in an event of failure of the primary thrust path.

2. The rear engine attachment according to claim 1, wherein the breakage indicator is fixed to the external face of at least one of the flanges.

3. The rear engine attachment according to claim 2, wherein the breakage indicator is a hollow cylinder having an axis of revolution normal to a plane of the external face of the flange to which it is fixed.

* * * * *